United States Patent [19]
Kotani et al.

[11] Patent Number: 4,895,288
[45] Date of Patent: Jan. 23, 1990

[54] FACSIMILE DEVICE

[75] Inventors: Matahira Kotani; Hiroshi Morimoto; Masafumi Matsumoto; Ryoichi Kawai; Hiroshi Shirakoshi; Takashi Shinohara, all of Nara, Japan

[73] Assignee: Sharp Kabushiki Kaisha, Osaka, Japan

[21] Appl. No.: 273,628

[22] Filed: Nov. 17, 1988

Related U.S. Application Data

[63] Continuation of Ser. No. 71,988, Jul. 9, 1987.

[30] Foreign Application Priority Data

Jul. 9, 1986 [JP] Japan ................... 61-161213

[51] Int. Cl.4 .................. B65H 75/00; G11B 23/02; H04N 1/00
[52] U.S. Cl. ................... 226/109; 226/127; 358/498
[58] Field of Search ............. 226/89, 109, 110, 112, 226/127; 355/3 DR; 358/291, 498

[56] References Cited

U.S. PATENT DOCUMENTS

| | | | |
|---|---|---|---|
| 1,761,558 | 6/1930 | Brand | 226/109 X |
| 2,166,508 | 7/1939 | Shipley et al. | 226/127 X |
| 2,686,050 | 8/1954 | DeZelar | 226/127 |
| 4,005,257 | 1/1977 | Krallinger | 358/498 X R |
| 4,185,760 | 1/1980 | McNew | 226/109 |
| 4,583,844 | 4/1986 | Honda | 355/3 DR X |
| 4,646,162 | 2/1987 | Sue | 358/291 |
| 4,702,587 | 10/1987 | Miyoshi | 355/3 DR X |
| 4,737,817 | 4/1988 | Kando et al. | 355/3 DR |
| 4,754,337 | 6/1988 | Nohtomi et al. | 358/498 X R |
| 4,768,100 | 8/1988 | Kunishima et al. | 358/498 |
| 4,774,591 | 9/1988 | Matsunawa et al. | 358/498 |

OTHER PUBLICATIONS

Pages 1, 2, 5, 6 of the Instruction Manual of an IBM Series III Model 70 Copymachine, Copyright 1985.

Primary Examiner—Donald Watkins
Attorney, Agent, or Firm—Flehr, Hohbach, Test, Albritton & Herbert

[57] ABSTRACT

A facsimile device is composed of three separate units which are connected rotatably with respect to one another. A passageway for recording sheets is formed between the first and second units and can be opened and closed by rotating the second unit with respect to the first unit. Another passageway for an original document is formed between the second and third units and can be opened and closed by rotating the third unit with respect to the second unit. With the device thus structured, a jammed original as well as a jammed recording sheet can be removed quickly from the device.

9 Claims, 1 Drawing Sheet

FACSIMILE DEVICE

This is a continuation, of application Ser. No. 071,988 filed July 9, 1987.

BACKGROUND OF THE INVENTION

This invention relates to a facsimile device for receiving image data on recording paper and transmitting image data recorded on an original document. More particularly, the present invention relates to the structure of a cabinet for such a device. With a conventional facsimile device for such purposes, the cabinet is generally comprised of two units which are separable from each other along a passageway for recording paper sheets such that these recording sheets can be replaced easily, one of the units serving as the base part to which the other unit is rotatably attached such that the passageway for copy sheets can be opened and closed by moving the rotatable unit with respect to the base part. Thus, when a copy sheet becomes stuck in the passageway, the rotatable unit can be moved to open the passageway such that the sheet jamming the passageway can be removed extremely easily. By contrast, almost no attention has been paid to the jamming by an original document. It is therefore extremely difficult to remove an original document from a jammed passageway.

SUMMARY OF THE INVENTION

It is therefore an object of the present invention in view of the above to provide a facsimile device with a cabinet which is so structured that not only the passageway for recording sheets but also the passageway for original documents can be opened and closed, thereby facilitating the clearing of a jammed passageway for original documents in a facsimile device.

The above and other objects of the present invention are achieved by providing a facsimile device comprising a first unit which serves as the base part of the device, a second unit and a third unit which are rotatably connected to the first unit such that a passageway for recording sheets is formed between the first and second units, that the second unit is supported rotatably in the direction of opening and closing the passageway for recording sheets, that a passageway for original documents is formed between the second and third units and that the third unit is supported rotatably in the direction of opening and closing this passageway for original documents. With a facsimile device thus structured, the second unit is rotated with respect to the first unit in the direction of separating them apart such that the passageway for recording sheets is opened if a recording sheet becomes stuck in its passageway. If it is an original document that is stuck in the device, the third unit is rotated with respect to the second unit such that they become separated from each other to open the passageway for original documents. In other words, whether it is a recording sheet or an original document that becomes stuck inside the device, the jammed passageway can be easily opened and the sheet which is stuck can be easily removed.

BRIEF DESCRIPTION OF THE DRAWING

The accompanying drawing, which is a schematic sectional view of a facsimile device embodying the present invention is incorporated in and forms a part of the specification and serves to explain the principles of the invention.

DETAILED DESCRIPTION OF THE INVENTION

Figure 1:
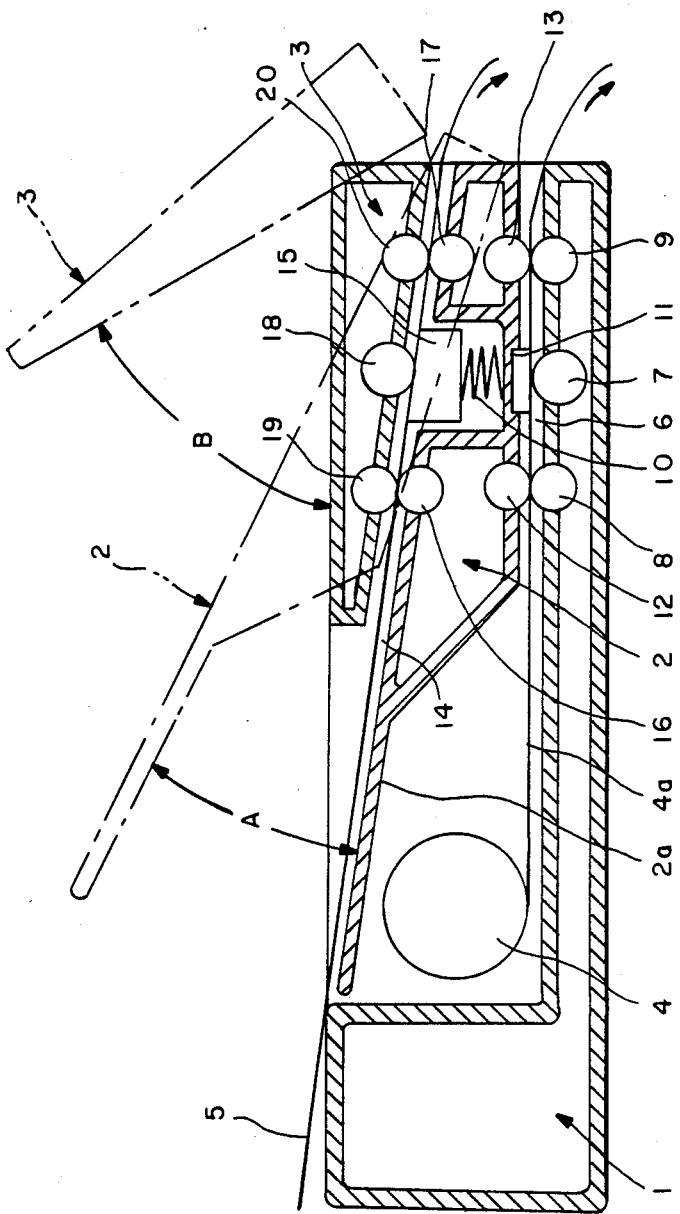

As shown in the accompanying FIGURE, a facsimile device embodying the present invention is characterized as comprising a first unit 1 which serves as the base part for the device, a second unit 2 which is axially connected to the first unit 1 at its lower end part so as to be rotatable in the directions of the arrows A, and a third unit 3 which is axially connected to the second unit 2 at its lower end part so as to be rotatable in the directions of the arrows B. The first unit 1 supports a roll 4 of thermal recording paper rotatably at its upper surface section and contains therein principal constituent elements of the device such as a power circuit and various other electrical circuits. The second unit 2 includes a supporting member 2a over the thermal recording paper roll 4 for supporting a document 5 thereon. Between the first unit 1 and the second unit 2, there is formed a passageway 6 for a thermal recording sheet 4a which is pulled out of the thermal recording paper roll 4. The upper surface of the first unit 1 serves as a guide to the recording sheet 4a. Along this passageway 6 for recording sheets, there are a platen roller 7 and a pair of paper feed rollers 8 and 9 flanking it on the first unit 1. The second unit 2 is correspondingly provided with a thermal head 11 which is pressed by a spring 10 against the recording sheet 4a on the platen roller 7 for thermally recording an image on the recording sheet 4a according to received data signals, a pair of pinch rollers 12 and 13 which are pressed respectively against the paper feed rollers 8 and 9 across the recording sheet 4a and a driving power source (not shown). When the third unit 3 is closed with respect to the second unit 2 as shown by solid lines in FIGURE, there is formed therebetween a passageway 14 for passing therethrough the document 5 set on the document supporting member 2a of the second unit 2. Along this passageway 14 for original documents, the second unit 2 provides an optical reader 15 for the document 5 and document feed rollers 16 and 17 flanking the optical reader 15 in the direction of motion of the document 5 in this passageway 14. Correspondingly, the third unit 3 provides a background roller 18 and a pair of pinch rollers 19 and 20 flanking the background roller 18 and adapted to be pressed respectively against the document feed rollers 16 and 17. The aforementioned spring 10 supplies an upward biasing force on the optical reader 15 against the background roller 18 such that the background roller 18 causes the document 5 to initially contact the optical reader 15.

When an image signal is received by the facsimile device thus structured, the pairs of paper feed rollers 8 and 9 and pinch rollers 12 and 13 cause a recording sheet 4a to travel through the passageway 6 at a constant speed and image data are thermally recorded on the recording sheet 4a by the thermal head 11 driven by the received data signal. When it is desired to transmit image data recorded on a document 5, on the other hand, the document 5 set on the document supporting member 2a is transported at a uniform rate through the document passageway 14 by the pairs of feed rollers 16 and 17 and pinch rollers 19 and 20 and, in the mean time, the optical reader 15 which is pressed against the document 5 by means of the spring 10 and the background roller 18 optically reads the image data recorded on the document 5.

If the recording sheet 4a becomes stuck in its passageway 6, the user has only to lift the second unit 2, together with the third unit 3, to the position shown by broken lines in FIGURE, thereby opening the passageway 6. If the document 5 is stuck in the document passageway 14, on the other hand, the third unit 3 is lifted as shown by broken lines in the FIGURE with the second unit 2 kept in the closed position as shown by solid lines. This opens the document passageway 14 and the document clogging it can be easily removed. In summary, both passageways 6 and 14 through the device can be individually opened such that a clogging sheet of paper, be it an original document or a copy sheet, can be easily and quickly removed. Another advantage of the present invention is that the entire device can be designed compactly because the cabinet is divided into three constituent parts.

The foregoing description of a preferred embodiment of the invention has been presented for purposes of illustration and description. It is not intended to be exhaustive or to limit the invention to the precise form disclosed. Any modifications and variations that may be apparent to a person skilled in the art are included within the scope of this invention.

What is claimed is:

1. A facsimile device comprising
   a first unit which serves as a base part for said device,
   a second unit rotatably supported by said first unit, and
   a third unit rotatably supported by said unit, said first unit and said second unit forming therebetween a recording sheet passageway which can be opened and closed by rotating said second unit with respect to said first unit, said second unit and said third unit forming therebetween a document passageway which can be opened and closed by rotating said third unit with respect to said second unit.

2. The facsimile device of claim 1 wherein said second unit is axially connected to said first unit at a lower end part thereof.

3. The facsimile device of claim 1 wherein said third unit is axially connected to said second unit at a lower end part thereof.

4. The facsimile device of claim 1 wherein said first unit rotatable supports a roll of recording sheets.

5. The facsimile device of claim 4 wherein said second unit includes a member for supporting an original document thereon.

6. The facsimile device of claim 5 wherein said supporting member is disposed above said roll.

7. The facsimile device of claim 1 wherein said second unit and said third unit rotate in the same direction with respect respectively to said first unit and said second unit to open said recording sheet passageway and said document passageway, respectively.

8. The facsimile device of claim 1 wherein said second unit has a document supporting table for supporting thereon a document sheet traveling along said document passageway.

9. The facsimile device of claim 1 wherein said second unit supports thereon a thermal head and a biasing means for pressing said thermal head against a recording sheet traveling along said recording sheet passageway.

* * * * *